Nov. 25, 1941.  J. HAMMERL  2,263,806

MOTOR VEHICLE

Filed Sept. 23, 1938

INVENTOR.
Jacob Hammerl
BY Sibbetts & Hart
ATTORNEYS

Patented Nov. 25, 1941

2,263,806

UNITED STATES PATENT OFFICE 2,263,806

MOTOR VEHICLE

Jacob Hammerl, Detroit, Mich., assignor to Packard Motor Car Company, Detroit, Mich., a corporation of Michigan Application September 23, 1938, Serial No. 231,284

1 Claim. (Cl. 20—69)

This invention relates to the sealing of doors and more particularly to the sealing of motor vehicle doors.

In order that motor vehicle doors will fit tightly when closed, it has been found necessary to devise some form of sealing means that is deformed in the door opening. Such means usually comprises a strip of rubber that is applied around the edge portion of the door and usually consists of a continuous strip in order that there will be only one joint. Obviously such strips must be bent at relatively sharp angles in order to follow the contour of the door. When the strips are formed of molded rubber they become deformed due to the angular bending and unsealed spaces therefore result. Sponge rubber strips have been more generally used because they provide a seal even though they are somewhat deformed when bent around the door. However, the sponge rubber strips while providing a satisfactory seal have the disadvantage that they are porous and retain moisture which causes rusting of the adjacent metal surfaces.

An object of this invention is to provide a hollow door sealing strip that can be bent for assembly without deformation that will cause leaks, and which at the same time has a contact portion that is sufficiently flexible to be readily deformed by the door when in closed position.

Another object of the invention is to provide a rubber sealing strip for doors that is impervious to moisture and can be applied to follow the door contour without distortion such that the sealing efficiency will be impaired.

Another object of the invention is to provide a hollow molded rubber sealing strip with interior reinforcements that will resist collapsing when the strip is bent to assembled form.

Another object of the invention is to provide a tubular interiorly reinforced rubber sealing strip having a contact sector that is more readily collapsible than the remaining portion.

A further object of the invention is to provide a molded rubber sealing strip having three sectors, one of which is more readily deformable than the other two.

Other objects of the invention will appear from the following description taken in connection with the drawing, which forms a part of this specification, and in which.

Figure 1:
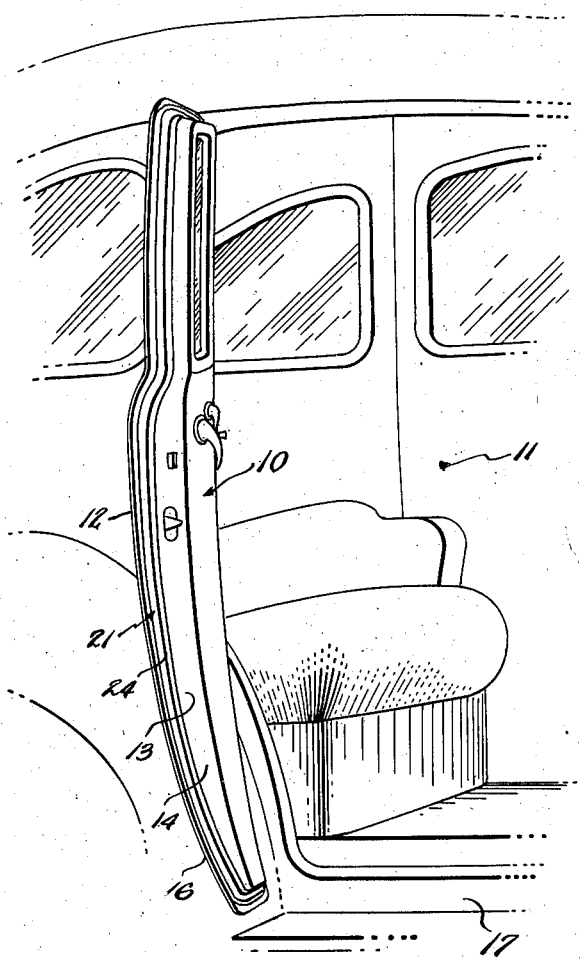
Fig. 1 is a fragmentary side elevational view of a rear portion of a motor vehicle showing the invention associated with a rear door.

The invention is shown applied to a rear door 10 of a conventional form of motor vehicle 11. The door is composed of an outer panel 12 and an inner panel 13 having its outer portion bent outwardly and then vertically to form a jamb rail 14 and a vertical edge 15 that the edge portion 16 of the outer panel is crimped over.

Figure 2:
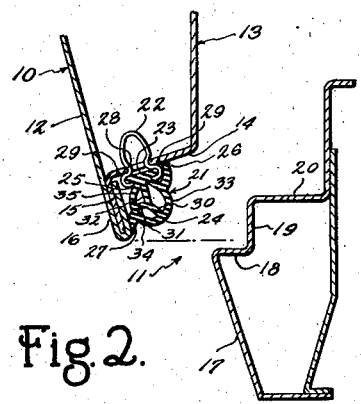
Fig. 2 is a fragmentary vertical sectional view showing the door with which the invention is associated about to contact the door jamb.
Figure 3:
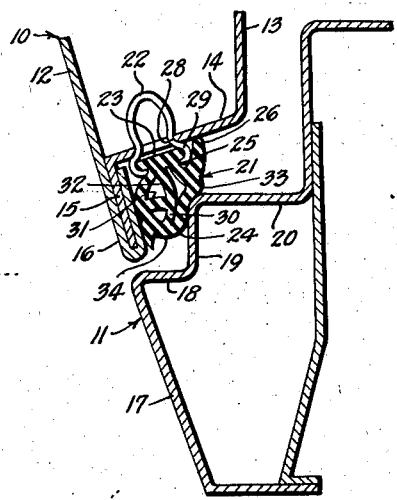
Fig. 3 is a view similar to Fig. 2 showing the door in closed position.

The door fits into an opening in the body structure that is formed by a wall formation as best shown in Figs. 2 and 3. This wall formation includes an outer panel 17 that is bent inwardly forming a transverse surface 18, then upwardly forming a vertical surface 19 and then transversely forming a surface 20, the surfaces 18, 19 and 20 forming the door jamb.

Sealing means for the space between the door and door jamb, forming the subject of this invention, comprises a strip indicated generally at 21 and securing clips 22. The strip is preferably formed as a unitary rubber structure that is impervious to moisture and comprises a flat base 23, a tubular section 24 and a neck 25 joining the tubular portion with the base. Projecting from the tubular section adjacent one side of the neck is a curved flexible flange 26 that is coextensive with and arranged to overlie one edge of the base for the purpose of covering the fastening clips that would otherwise be exposed to view. Another flexible flange 27 forms a part of the strip and is coextensive with and projects from the tubular section, substantially diametric to flange 26. This flange 27 is of angular cross-section and is located and arranged to lie against the edge portion of the door in sealing relation therewith when the strip is applied to the jamb rail.

The transverse jamb rail 14 of the door is formed with a plurality of openings 28 through which the head of the spring steel clips 22 can be inserted when contracted. The spring clips are preferably formed of a single piece of wire that is bent to form the head from which arms 29 extend, the arms being curved to embrace the edges of the base portion of the strip. After the clips are snapped onto the base portion of the strip the heads thereof are contracted and inserted into the openings in the jamb rail and when released they expand and secure the clips with the jamb rail. The flange 26 lies over the inside arm of the clips thus covering them from view. The application of the strip to the door will flex the flange 27, so that one side thereof lies in sealing contact against the edge of the door.

Figure 4:
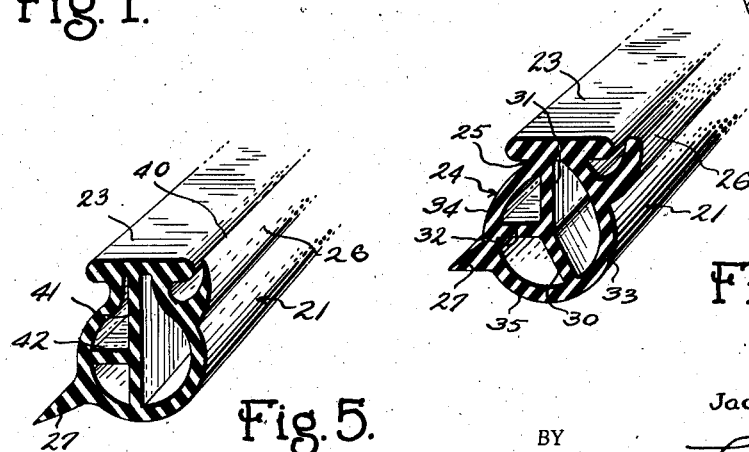
Fig. 4 is a sectional and perspective view of the sealing strip of the invention.

The tubular section of the strip is formed with unitary intersecting interior webs 30, 31 and 32 that divide the tubular section into three sectors 33, 34 and 35. The general purpose of the webs is to provide reinforcing means for the interior of the tubular structure so that it can be bent around the door without collapsing sufficiently to cause spaces through which air can leak when the door is closed. In the preferred form of the invention shown in Figs. 2, 3 and 4, such reinforcing webs are generally in the form of a Y and they reinforce the tubular section of the strip in a plurality of directions. The webs are arranged to resist deformation of the tubular section of the strip when bent around the edge of the door so that collapsing of such section at the bent portions is prevented. The sector 33 of the tubular section of the strip forms the contact surface for engaging the door jamb when the door is closed and it will be noted that this sector is larger and thus more readily deformed than the other sectors. Thus the contact sector will flex readily when engaging the door jamb to provide the desirable leak-proof seal upon the application of the usual force used in closing the door. The interior webs stiffen the tubular section of the sealing strip where required to maintain a desired cross-sectional form at the bends when applied to a door and leave a sealing contact sector surface that can be more readily deformed than the other sector surfaces.

Figure 5:
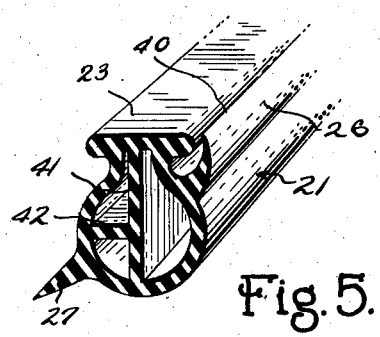
Fig. 5 is a perspective and sectional view of the modified form of sealing strip.

In the modified form of strip shown in Fig. 5, the structure is substantially the same except that the flange 26 terminates in an angular edge 40 instead of in a blunt edge as shown in the preferred form of the invention, and the web structure within the generally tubular section of the strip instead of being in general Y form consists of a straight web 41 extending centrally through the interior and a straight web 42 joining one side of the web 41 with the interior surface of the tubular section and extending normal to the web 41. The contact sector from which the flange 26 projects is of larger area and thus more flexible in the modified form of the invention than the corresponding sector in the preferred form of the invention. For some uses this modified construction is desirable.

Although the invention has been described in connection with a specific embodiment, the principles involved are susceptible of numerous other applications which will readily occur to persons skilled in the art. The invention is therefore to be limited only as indicated by the scope of the appended claim.

What is claimed is:

A rubber weather strip comprising a relatively flat solid anchor portion, a tubular portion joined to one face of the anchor portion, a reinforcing diametrically extending web in the tubular portion joined to the anchor portion and the tubular portion along its opposite edges, and a reinforcing web in the tubular portion substantially parallel with the anchor portion joined to the diametrically extending web and the tubular portion along its opposite edges.

JACOB HAMMERL.